United States Patent
Nozaki et al.

(10) Patent No.: US 11,973,188 B2
(45) Date of Patent: Apr. 30, 2024

(54) NON-AQUEOUS ELECTROLYTE SECONDARY BATTERY AND NON-AQUEOUS ELECTROLYTE

(71) Applicant: Panasonic Intellectual Property Management Co., Ltd., Osaka (JP)

(72) Inventors: Yasuko Nozaki, Osaka (JP); Tasuku Ishiguro, Osaka (JP); Tomohisa Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 442 days.

(21) Appl. No.: 17/289,373

(22) PCT Filed: Oct. 30, 2019

(86) PCT No.: PCT/JP2019/042649
§ 371 (c)(1),
(2) Date: Apr. 28, 2021

(87) PCT Pub. No.: WO2020/090922
PCT Pub. Date: May 7, 2020

(65) Prior Publication Data
US 2022/0006120 A1 Jan. 6, 2022

(30) Foreign Application Priority Data
Oct. 31, 2018 (JP) .................. 2018-205309

(51) Int. Cl.
*H01M 10/0567* (2010.01)
*H01M 10/0525* (2010.01)
*H01M 10/0568* (2010.01)

(52) U.S. Cl.
CPC .... *H01M 10/0567* (2013.01); *H01M 10/0525* (2013.01); *H01M 10/0568* (2013.01); *H01M 2300/004* (2013.01)

(58) Field of Classification Search
None
See application file for complete search history.

(56) References Cited

U.S. PATENT DOCUMENTS

| 5,870,275 A | 2/1999 | Shiono et al. |
| 2016/0141720 A1* | 5/2016 | Onozaki ........... H01M 10/0567 429/327 |

(Continued)

FOREIGN PATENT DOCUMENTS

| CN | 1117323 A | 2/1996 |
| JP | 11-67270 A | 3/1999 |

(Continued)

OTHER PUBLICATIONS

Office Action dated Sep. 12, 2023, issued in counterpart JP application No. 2020-553996. (4 pages).

(Continued)

*Primary Examiner* — Wyatt P McConnell
(74) *Attorney, Agent, or Firm* — WHDA, LLP

(57) ABSTRACT

A non-aqueous electrolyte secondary battery including a positive electrode, a negative electrode, a separator interposed between the positive electrode and the negative electrode, and a non-aqueous electrolyte. The non-aqueous electrolyte contains a lithium salt and a carboxylic acid, and the lithium salt includes lithium difluorophosphate. The content of the carboxylic acid in the non-aqueous electrolyte is 5 ppm or more and 900 ppm or less with respect to the mass of the non-aqueous electrolyte.

14 Claims, 1 Drawing Sheet

(56) References Cited

U.S. PATENT DOCUMENTS

| | | |
|---|---|---|
| 2017/0214091 A1 | 7/2017 | Abe et al. |
| 2017/0331158 A1 | 11/2017 | Jito et al. |
| 2018/0241085 A1 | 8/2018 | Hasegawa |

FOREIGN PATENT DOCUMENTS

| | | |
|---|---|---|
| JP | 2007-165297 A | 6/2007 |
| JP | 2013-038072 A | 2/2013 |
| JP | 2014-007132 A | 1/2014 |
| JP | 2014-035956 A | 2/2014 |
| JP | 2015-72858 A | 4/2015 |
| JP | WO2016/136179 A1 | 12/2017 |
| JP | 2018-133283 A | 8/2018 |
| WO | 2015/046175 A1 | 4/2015 |
| WO | 2016/017809 A1 | 2/2016 |

OTHER PUBLICATIONS

International Search Report dated Jan. 28, 2020, issued in counterpart application No. PCT/JP2019/042649, w/ English translation (5 pages).

Office Action dated Dec. 15, 2023, issued in counterpart CN application No. 201980070625.6, with partial English translation. (9 pages).

* cited by examiner

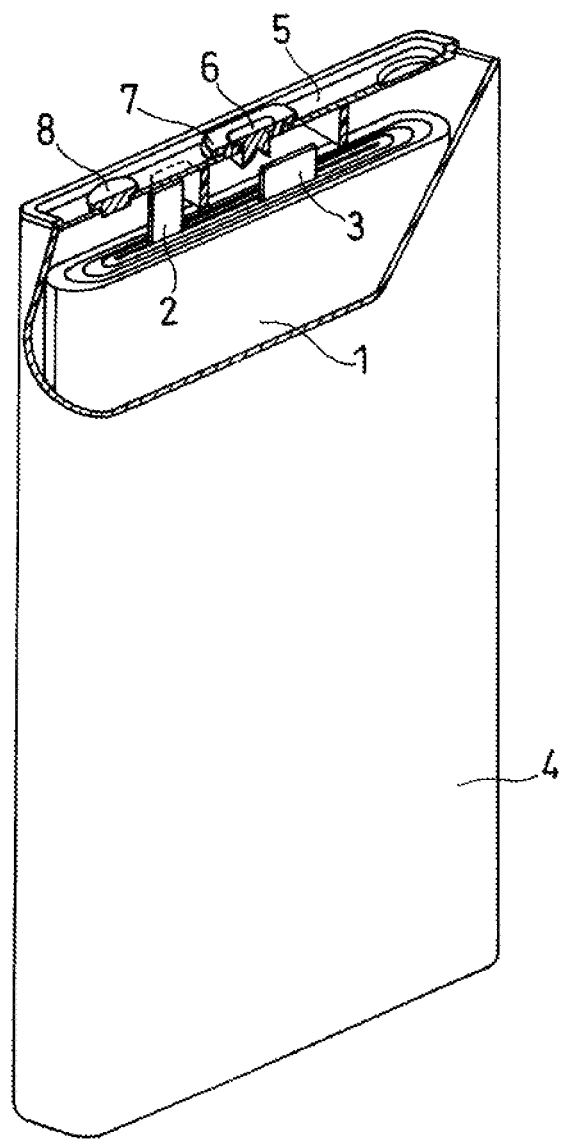

NON-AQUEOUS ELECTROLYTE SECONDARY BATTERY AND NON-AQUEOUS ELECTROLYTE

TECHNICAL FIELD

The present invention mainly relates to an improvement of a non-aqueous electrolyte.

BACKGROUND ART

Non-aqueous electrolyte secondary batteries, especially lithium ion secondary batteries, have a high voltage and a high energy density, and have been expected as a promising power source for small consumer applications, power storage devices, and electric vehicles.

Patent Literature 1 proposes adding difluorophosphoric acid to an electrolyte in order to improve the battery storage characteristics. Patent Literature 2 proposes containing lithium difluorophosphate in an amount of 10 ppm or more in the whole non-aqueous electrolyte.

CITATION LIST

Patent Literature

[PTL 1] Japanese Laid-Open Patent Publication No. Hei 11-67270

[PTL 2] Japanese Laid-Open Patent Publication No. 2007-165297

SUMMARY OF INVENTION

Technical Problem

In a high temperature storage test, when the battery storage is extended over a long period of time, the direct current resistance (DCIR) of a battery including a non-aqueous electrolyte to which lithium difluorophosphate is added tends to increase. An impedance analysis of the battery after high temperature storage shows a remarkable increase of the reaction resistance on the positive electrode side. This is presumably because the reaction between the alkaline component in the positive electrode and the lithium difluorophosphate proceeds gradually, forming an inert surface film on the outer layer of the positive electrode active material, resulting in an increase in DCIR.

Solution to Problem

In view of the above, one aspect of the present invention relates to a non-aqueous electrolyte secondary battery, including: a positive electrode; a negative electrode; a separator interposed between the positive electrode and the negative electrode; and a non-aqueous electrolyte, wherein the non-aqueous electrolyte contains a lithium salt and a carboxylic acid, the lithium salt includes lithium difluorophosphate, and a content of the carboxylic acid in the non-aqueous electrolyte is 5 ppm or more and 900 ppm or less with respect to a mass of the non-aqueous electrolyte.

Another aspect of the present invention relates to a non-aqueous electrolyte, including: a lithium salt; and a carboxylic acid, wherein the lithium salt includes lithium difluorophosphate, and a content of the carboxylic acid is 5 ppm or more and 900 ppm or less in terms of a mass ratio.

Advantageous Effects of Invention

According to the present invention, it is possible to suppress an increase in DCIR in a high temperature storage test of a non-aqueous electrolyte secondary battery.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

[FIG. 1] A partially cut-away schematic oblique view of a non-aqueous electrolyte secondary battery according to one embodiment of the present invention.

DESCRIPTION OF EMBODIMENTS

A non-aqueous electrolyte secondary battery according to an embodiment of the present invention includes a positive electrode, a negative electrode, a separator interposed between the positive electrode and the negative electrode, and a non-aqueous electrolyte. The non-aqueous electrolyte taken out from the battery contains a lithium salt and a carboxylic acid as essential components, and the lithium salt includes lithium difluorophosphate. Lithium difluorophosphate or its anion, alone or in combination with one or more other electrolyte components, forms a surface film with good quality on the outer layer of the positive electrode active material, thereby to act to suppress an excessive side reaction of the electrolyte components. Therefore, the difluorophosphate anion contributes to an improvement of the storage characteristics of the battery in a medium-term.

On the other hand, the carboxylic acid acts to inhibit the inactivation of the positive electrode active material outer layer. The carboxylic acid neutralizes the alkaline component derived from the positive electrode active material or adsorbs onto the positive electrode active material surface, thereby to facilitate a good-quality surface film formation at the positive electrode that proceeds with involvement of lithium difluorophosphate or its anion, and thus to inhibit the inactivation, due to the side reaction of the electrolyte, of the positive electrode active material outer layer. Consequently, in a long term, the amount of the inert surface film that grows on the outer layer of the positive electrode active material decreases.

The carboxylic acid may be present, in the non-aqueous electrolyte, as a Broensted acid in which hydrogen remains undissociated, or a carboxylate anion from which hydrogen has been dissociated. The carboxylate anion may be an anion derived from a carboxylate. This means that a total amount of the carboxylic acid and the carboxylate anion can be determined as a content of the carboxylic acid in the non-aqueous electrolyte. Hereinafter, the carboxylic acid, the carboxylate, and the carboxylate anion are sometimes collectively referred to as a carboxylic group.

Also, the lithium difluorophosphate may be present, in the non-aqueous electrolyte, as a difluorophosphate anion. The difluorophosphate anion may be present in the state of a difluorophosphoric acid to which hydrogen is bonded, in the non-aqueous electrolyte. This means that a total amount of the lithium difluorophosphate, the difluorophosphoric acid, and the difluorophosphate anion can be determined as a content of the lithium difluorophosphate in the non-aqueous electrolyte. Hereinafter, the lithium difluorophosphate, the difluorophosphoric acid, and the difluorophosphate anion are sometimes collectively referred to as a difluorophosphoric group.

[Non-Aqueous Electrolyte]

The non-aqueous electrolyte usually contains a non-aqueous solvent and a solute dissolved in the non-aqueous solvent. The difluorophosphoric acids and the carboxylic acids constitute at least part of at least one of the non-aqueous solvent and the solute. The solute includes at least a lithium salt, and the lithium salt dissolves in the non-aqueous solvent and generates lithium ions being an essential component. The difluorophosphate anion is formed when the difluorophosphoric acid or its salt is dissociated or ionized in the non-aqueous solvent. In other words, the non-aqueous electrolyte according to the present embodiment contains a non-aqueous solvent and a solute dissolved in the non-aqueous solvent. The solute includes at least a lithium salt. At least one of the solvent and the solute includes the difluorophosphoric group and the carboxylic group. The difluorophosphoric group is at least one kind selected from the group consisting of difluorophosphoric acid, difluorophosphate, and difluorophosphate anion. The carboxylic group is at least one kind selected from the group consisting of carboxylic acid, carboxylate, and carboxylate anion.

The content of the carboxylic acid in the non-aqueous electrolyte is not specifically limited, and may be as small as close to the identification limit. To put it differently, when the carboxylic acid is present in the non-aqueous electrolyte, the action and effect of suppressing the DCIR according thereto can be observed. For example, the content of the carboxylic acid may be 5 ppm or more and 900 ppm or less, and may be 5 ppm or more and 500 ppm or less, with respect to the mass of the non-aqueous electrolyte. The content of the carboxylic acid contained in the non-aqueous electrolyte may be 100 ppm or less with respect to the mass of the non-aqueous electrolyte. By regulating the presence of the carboxylic acid in the non-aqueous electrolyte as above, an increase in DCIR of the battery during long-term storage at a high temperature (e.g., 50 to 60° C.) can be easily suppressed. That is, by suppressing the carboxylic acid amount to an appropriate amount, the side reaction on the positive electrode side in which the carboxylic acid is involved can also be suppressed.

The content of the carboxylic acid in the non-aqueous electrolyte can be determined as a total amount of the undissociated carboxylic acid, the undissociated carboxylate, and the carboxylate anion. The content of the carboxylate anion can be determined by conversion into the mass of the carboxylic acid added with the mass of the dissociated hydrogen. For example, given that the carboxylic acid is an acetic acid (molecular weight: 60.05) or an acetate, and the whole acetic acid or acetate in the non-aqueous electrolyte is dissociated and present as an acetate anion, the content of the acetic acid in the non-aqueous electrolyte can be determined on the basis of the formula mass of $CH_3COOH$ supposing acetic acid remains undissociated. In other words, supposing that the carboxylic group is all carboxylic acid, the content can be determined.

The carboxylic acid includes, for example, at least one kind selected from the group consisting of carboxylic acids having two to four carbon atoms. And, 80 mass % or more of the carboxylic acid may be one or more of the carboxylic acids having two to four carbon atoms. Examples of the carboxylic acids having two to four carbon atoms include an acetic acid having two carbon atoms, an oxalic acid having two carbon atoms, a propionic acid having three carbon atoms, a malonic acid having three carbon atoms, a butyric acid having four carbon atoms, a succinic acid having four carbon atoms. These may be contained singly in the non-aqueous electrolyte, or two or more kinds of them may be contained. Preferred is a monocarboxylic acid in terms of its low viscosity, and particularly preferred is an acetic acid.

The content of the lithium difluorophosphate in the non-aqueous electrolyte is, in view of sufficiently improving the storage characteristics of the battery, for example, 0.1 mass % or more, and may be 0.5 mass % or more, with respect to the mass of the non-aqueous electrolyte. In view of suppressing the formation of an inert surface film at the outer layer of the positive electrode active material as much as possible, and allowing the carboxylic acid to exert its action as much as possible, the content of the lithium difluorophosphate may be set to 1.5 mass % or less, and may be 1.0 mass % or less, with respect to the mass of the non-aqueous electrolyte.

The content of the lithium difluorophosphate in the non-aqueous electrolyte can be determined as a total amount of the undissociated difluorophosphoric acid or lithium difluorophosphate, and the difluorophosphate anion, and the content can be determined by converting the whole amount into a mass of the lithium difluorophosphate. In other words, supposing that the difluorophosphoric group is all lithium difluorophosphate, the content can be determined. For example, when the non-aqueous electrolyte contains lithium difluorophosphate, and the whole lithium difluorophosphate is dissociated and present as a difluorophosphate anion, the whole difluorophosphate anion is supposed to remain as lithium difluorophosphate ($LiPO_2F_2$). The lithium difluorophosphate amount contained in the non-aqueous electrolyte can be determined on the basis of the formula mass (107.91) of the lithium difluorophosphate.

The non-aqueous electrolyte may further contain an alcohol. The alcohol is considered to adsorb, together with the carboxylic acid, onto the surface of the positive electrode active material, thereby to assist the action of suppressing the side reaction in which the lithium difluorophosphate is involved.

The content of the alcohol in the non-aqueous electrolyte is, for example, 900 ppm or less, may be 500 ppm or less, and may be 100 ppm or less, with respect to the mass of the non-aqueous electrolyte. To obtain the effect of the alcohol sufficiently, the content of the alcohol is preferably set to 5 ppm or more with respect to the mass of the non-aqueous electrolyte.

The alcohol includes at least one kind selected from the group consisting of, for example, alcohols having one to three carbon atoms. And, 80 mass % or more of the alcohol may be one or more of the alcohols having one to three carbon atoms. Examples of the alcohols having one to three carbon atoms include a methanol having one carbon atom, an ethanol having two carbon atoms, an ethylene glycol having two carbon atoms, a propanol having three carbon atoms, and a propylene glycol having three carbon atoms. These may be contained singly in the non-aqueous electrolyte, or two or more kinds of them may be contained. Preferred is a monoalcohol in terms of its low viscosity, and particularly preferred is a methanol.

The non-aqueous electrolyte before injected into a battery also contains a lithium salt and a carboxylic acid, and the lithium salt includes lithium difluorophosphate. When the non-aqueous electrolyte included in the battery is subjected to preliminary or initial charge and discharge before shipment, however, the lithium difluorophosphate and the carboxylic acid may possibly be each partially consumed by the film formation. Therefore, in preparing or producing the non-aqueous electrolyte, with taking the amount of components to be consumed by the film formation into account, the blending is determined so that the components can each remain present in a sufficient amount as described above in the battery after shipment.

The content of the carboxylic acid in the non-aqueous electrolyte before injected into a battery is, for example, 5 ppm or more or 10 ppm or more, and 900 ppm or less or 500 ppm or less, in terms of a mass ratio. Furthermore, the content of the alcohol in the non-aqueous electrolyte before injected into a battery is, for example, 5 ppm or more or 10 ppm or more, and 900 ppm or less or 500 ppm or less, in terms of a mass ratio.

The content of the carboxylic acids and the content of the alcohol in the non-aqueous electrolyte can be measured using, for example, gas chromatography mass spectrometry (GC-MS). The content of the lithium salt and the content of the difluorophosphoric group can be measured using, for example, NMR, or ion chromatography.

Examples of the lithium salt include a lithium salt of a chlorine-containing acid (e.g., $LiClO_4$, $LiAlCl_4$, $LiB_{10}Cl_{10}$), a lithium salt of a fluorine-containing acid (e.g., $LiPF_6$, $LiBF_4$, $LiSbF_6$, $LiAsF_6$, $LiCF_3SO_{33}$, $LiCF_3CO_2$, $LiPO_2F_2$ (lithium difluorophosphate), $Li_2PO_3F$ (lithium monofluorophosphate)), a lithium salt of a fluorine-containing acid imide (e.g., $LiN(FSO_2)_2$ (lithium bis(fluorosulfonyl)imide), $LiN(CF_3SO_2)_2$, $LiN(CF_3SO_2)(C_4F_9SO_2)$, $LiN(C_2F5SO_2)_2$), and lithium halide (e.g., LiCl, LiBr, LiI). The lithium salt may be used singly or in combination of two or more kinds. Among them, $LiPF_6$, $LiBF_4$, $LiClO_4$, $LiCF_3SO_3$, $LiN(FSO_2)_2$, and the like are often used as a principal component of the lithium salt.

Here, lithium bis(fluorosulfonyl)imide (hereinafter, LFSI) is preferred, since this can improve the quality of the surface film to be formed with involvement of the lithium difluorophosphate or the carboxylic acid, at the outer layer of each of the positive electrode active material and the negative electrode active material. The LFSI may be used in combination with one or more other lithium salts, such as $LiPF_6$ and $LiBF_4$. The LFSI amount in the whole lithium salt is, for example, 5 mol % or more, and may be 20 mol % or more, and can be, for example, 50 mol % or less.

The lithium salt may include lithium carboxylate. In this case, the carboxylate anion derived from the lithium carboxylate constitutes part of the carboxylic acid as mentioned above, which is an essential component of the non-aqueous electrolyte.

The content of the lithium salt in the non-aqueous electrolyte is, for example, 0.5 mol/liter or more and 3 mol/liter or less, and may be 1 mol/liter or more and 2 mol/liter or less.

The non-aqueous solvent is not specifically limited, and examples thereof include a cyclic carbonic ester, a chain carbonic ester, a cyclic carboxylic acid ester, a chain carboxylic acid ester, a cyclic ether, and a chain ether. Examples of the cyclic carbonic ester include propylene carbonate (PC) and ethylene carbonate (EC). Examples of the chain carbonic ester include diethyl carbonate (DEC), ethyl methyl carbonate (EMC), and dimethyl carbonate (DMC). Examples of the cyclic carboxylic acid ester includes γ-butyrolactone (GBL) and γ-valerolactone (GVL). Examples of the chain carboxylic acid ester include ethyl acetate, methyl acetate, ethyl propionate, and methyl propionate. The non-aqueous solvent may be used singly or in combination of two or more kinds.

[Negative Electrode]
The negative electrode incudes, for example, a negative electrode current collector, and a negative electrode material mixture layer formed on a surface of the negative electrode current collector and containing a negative electrode active material. The negative electrode material mixture layer can be formed by, for example, applying a negative electrode slurry obtained by dispersing a negative electrode material mixture including a negative electrode active material, a binder and the like in a dispersion medium, onto a surface of the negative electrode current collector, followed by drying. The dry applied film may be rolled, if necessary. The negative electrode material mixture layer may be formed on one surface or both surfaces of the negative electrode current collector.

The negative electrode active material may be any material that electrochemically absorbs and releases lithium ions, and examples thereof include a carbon material and an alloy-type material. Examples of the carbon material include graphite, graphitizable carbon (soft carbon), and non-graphitizable carbon (hard carbon). Preferred among them is graphite, which is stable during charge and discharge and whose irreversible capacity is small. Examples of the alloy-type material include silicon, tin, a silicon alloy, a tin alloy, and a silicon compound. Among them, a composite material comprising a lithium silicate phase and silicon particles dispersed in the lithium silicate phase is preferred in terms of its high capacity and small irreversible capacity.

The negative electrode current collector may be in the form of, for example, metal foil, mesh, net, or punched sheet. Examples of the material of the negative electrode current collector include stainless steel, nickel, a nickel alloy, copper, and a copper alloy.

[Positive Electrode]
The positive electrode incudes, for example, a positive electrode current collector, and a positive electrode material mixture layer formed on a surface of the positive electrode current collector and containing a positive electrode active material. The positive electrode material mixture layer can be formed by, for example, applying a positive electrode slurry obtained by dispersing a positive electrode material mixture including a positive electrode active material, a binder and the like in a dispersion medium, onto a surface of the positive electrode current collector, followed by drying. The dry applied film may be rolled, if necessary. The positive electrode material mixture layer may be formed on one surface or both surfaces of the positive electrode current collector.

The positive electrode active material may be, for example, a lithium-containing composite oxide. Examples thereof include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, and $Li_2MPO_4F$, where M is at least one kind selected from the group consisting of Na, Mg, Sc, Y, Mn, Fe, Co, Ni, Cu, Zn, Al, Cr, Pb, Sb, and B. Here, a=0 to 1.2, b=0 to 0.9, and c=2.0 to 2.3. The value "a" representing the molar ratio of lithium is subjected to increase and decrease during charge and discharge.

Preferred is a lithium-nickel composite oxide represented by $Li_aNi_bM_{1-b}O_2$, where M is at least one kind selected from the group consisting of Mn, Co, and Al, and 0≤a≤1.2 and 0.3≤b≤1. In view of achieving a high capacity, preferably, 0.85≤b≤1. In view of the stability of the crystal structure, more preferred is $Li_aNi_bCo_cAl_dO_2$ containing Co and Al as elements represented by M, where 0<a≤1.2, 0.85≤b<1, 0<c<0.15, 0<d≤0.1, and b+c+d=1.

The form and the thickness of the positive electrode current collector may be respectively selected from the forms and the range corresponding to those of the negative electrode current collector. Examples of the material of the positive electrode current collector include stainless steel, aluminum, an aluminum alloy, and titanium.

[Separator]

Usually, a separator is interposed between the positive electrode and the negative electrode. The separator is excellent in ion permeability and has moderate mechanical strength and electrically insulating properties. The separator may be, for example, a microporous thin film, a woven fabric, or a nonwoven fabric. The material of the separator is, for example, a polyolefin, such as polypropylene and polyethylene.

The non-aqueous electrolyte secondary battery, for example, has a structure in which an electrode group formed by winding the positive electrode and the negative electrode with the separator interposed therebetween is housed in an outer case, together with the non-aqueous electrolyte. The wound-type electrode group may be replaced with a different form of electrode group, for example, a stacked-type electrode group formed by stacking the positive electrode and the negative electrode with the separator interposed therebetween. The non-aqueous electrolyte secondary battery may be of any type, such as cylindrical type, prismatic type, coin type, button type, or laminate type.

FIG. 1 is a schematic partially cut-away oblique view of a non-aqueous electrolyte secondary battery according to an embodiment of the present invention. The battery includes a bottomed prismatic battery case 4, and an electrode group 1 and a non-aqueous electrolyte (not shown) housed in the battery case 4. The electrode group 1 has a long negative electrode, a long positive electrode, and a separator interposed therebetween.

A negative electrode lead 3 is attached at its one end to the negative electrode current collector, by means of welding or the like. A positive electrode lead 2 is attached at its one end to the positive electrode current collector, by means of welding or the like. The negative electrode lead 3 is electrically connected at its other end to a negative electrode terminal 6 disposed at a sealing plate 5. The negative terminal 6 is electrically insulated from the sealing plate 5 via a gasket 7. The positive electrode lead 2 is electrically connected at its other end to the battery case 4 serving as a positive electrode terminal. The opening of the battery case 4 is sealed with the sealing plate 5. The electrolyte injection hole provided in the sealing plate 5 is closed with a sealing stopper 8.

The present invention will be specifically described below with reference to Examples and Comparative Examples. It is to be noted, however, the present invention is not limited to the following Examples.

Examples 1 to 5 and Comparative Examples 1 to 5

[Production of Negative Electrode]

Graphite serving as a negative electrode active material, sodium carboxymethylcellulose, styrene-butadiene rubber (SBR), and water were mixed in a predetermined mass ratio, to prepare a negative electrode slurry. Next, the negative electrode slurry was applied onto a surface of a copper foil serving as a negative electrode current collector. The applied film was dried, and then rolled, to give a negative electrode material mixture layer formed on both sides of the copper foil.

[Production of Positive Electrode]

A lithium nickel composite oxide: $LiNi_{0.5}Co_{0.2}Mn_{0.3}O_2$ serving as a positive electrode active material, acetylene black, polyvinylidene fluoride, and N-methyl-2-pyrrolidone (NMP) were mixed in a predetermined mass ratio, to prepare a positive electrode slurry. Next, the positive electrode slurry was applied onto a surface of an aluminum foil serving as a positive electrode current collector. The applied film was dried, and then rolled, to give a positive electrode material mixture layer formed on both sides of the aluminum foil.

[Preparation of Non-Aqueous Electrolyte]

To a non-aqueous solvent containing ethylene carbonate (EC), ethyl methyl carbonate (EMC), and methyl acetate (MA) in a volume ratio of EC:EMC:MA=20:60:20, predetermined amounts of lithium salt ($LiPF_6$ and/or LFSI), lithium difluorophosphate (DFP) (mass % in the whole non-aqueous electrolyte), acetic acid as a carboxylic acid, and methanol as an alcohol (mass ratio in the whole non-aqueous electrolyte) were each added as shown in Table 1, to prepare a non-aqueous electrolyte. The purity of the methyl acetate was 99.9%.

[Fabrication of Non-Aqueous Electrolyte Secondary Battery]

The positive electrode and the negative electrode, with a lead attached to each electrode, were wound spirally with a separator interposed therebetween such that the leads were positioned at the outermost layer, thereby to form an electrode group. The electrode group was inserted into an outer case made of aluminum laminate film including an aluminum foil as a barrier layer, and dried under vacuum at 105° C. for 2 hours. The non-aqueous electrolyte was injected into the case, and the opening of the outer case was sealed. Batteries A1 to A5 of Examples and batteries B1 to B5 of Comparative Examples each having a design capacity of 5400 mAh were obtained.

TABLE 1

| Battery | $LiPF_6$ (mol/L) | LFSI (mol/L) | DFP (mass %) | Acetic acid (ppm) | Methanol (ppm) |
| --- | --- | --- | --- | --- | --- |
| A1 | 1.0 | 0.4 | 1 | 15 | 14 |
| A2 | 1.4 | 0 | 1 | 15 | 15 |
| A3 | 1.4 | 0 | 1 | 25 | 25 |
| A4 | 1.0 | 0.4 | 1 | 500 | 500 |
| A5 | 0.6 | 0.2 | 1 | 15 | 15 |
| B1 | 1.0 | 0.4 | 1 | 0 | 0 |
| B2 | 1.0 | 0.4 | 0 | 25 | 25 |
| B3 | 1.0 | 0.4 | 0 | 0 | 0 |
| B4 | 1.4 | 0 | 0 | 0 | 0 |
| B5 | 1.0 | 0.4 | 1 | 1000 | 1000 |

[Analysis of Non-Aqueous Electrolyte in Battery]

Each of the batteries after completion was constant-current charged at a current of 0.3 It (1620 mA) until the voltage reached 4.2 V, and then, constant-voltage charged at a constant voltage of 4.2 V until the current reached 0.02 It (108 mA). This was followed by a constant-current discharge at a current of 0.3 It (1620 mA) until the voltage reached 2.75 V.

With the rest time between charge and discharge set to 10 minutes, the above charge and discharge were repeated 5 cycles in total. Thereafter, the battery was taken out and disassembled, to analyze the non-aqueous electrolyte for its components by gas chromatography mass spectrometry (GC-MS) or the like. The content (mass ratio in the whole electrolyte) of the acetic acid and that of the methanol obtained by the analysis are shown in Table 2.

The measurement conditions of GC-MS used for the analysis of non-aqueous electrolyte were as follows.

Apparatus: GC17A, GCMS-QP5050A, available from Shimadzu Corporation Column: HP-1 (film thickness: 1.0 μm×length: 60 m), available from Agilent Technologies, Inc.

Column temperature: 50° C.=>110° C. (5° C./min, hold 12 min)=>250° C. (5° C./min, hold 7 min)=>300° C. (10° C./min, hold 20 min)

Split ratio: 1/50

Linear velocity: 29.2 cm/s

Inlet temperature: 270° C.

Injection amount: 0.5 μL

Interface temperature: 230° C.

Mass range: m/z=30 to 400 (SCAN mode), m/z=29, 31, 32, 43, 45, 60 (SIM mode), where 29, 31 and 32 are molecular weights of the molecules and fragments of methanol, and 43, 45 and 60 are molecular weights of the molecules and fragments of acetic acid.

Furthermore, the batteries A1 to A5 and the batteries B1 to B5 were evaluated by the following methods. The results are shown in Table 2.

[Initial DCIR]

The batteries having subjected to 5 cycles of the above charge and discharge were each constant-current charged at a current of 0.3 It (1620 mA) until the voltage reached 4.2 V, and then, constant-voltage charged at a constant voltage of 4.2 V until the current reached 0.00185 It (10 mA). After the rest for 120 minutes, a constant current of 0.5 It was allowed to pass through the battery, to measure the voltage at the 10th second. From the drop in voltage ΔV, the DCIR was determined.

[DCIR After High-Temperature Long-Term Storage]

The batteries having subjected to the initial DCIR measurement were left to stand in an environment of 60° C. for 2 months. After the 2 months, the batteries were taken out and each constant-current discharged at 25° C. at a current of 0.3 It (1620 mA) until the voltage reached 2.75V. This was followed by a constant-current charge at a current of 0.3 It (1620 mA) again, until the voltage reached 4.2 V, and subsequently followed by a constant-voltage charge at a constant voltage of 4.2 V until the current reached 0.00185 It (10 mA). After the rest for 120 minutes, a constant current of 0.5 It was allowed to pass through the battery, to measure the voltage at the 10th second. From the drop in voltage ΔV, the DCIR was determined. The percentage increase relative to the initial DCIR is shown in Table 2.

TABLE 2

| Battery | Acetic acid (ppm) | Methanol (ppm) | DCIR after storage (Ω) | Percentage increase in DCIR (%) |
|---|---|---|---|---|
| A1 | 7 | 6 | 0.062 | 68.1 |
| A2 | 8 | 7 | 0.063 | 68.0 |
| A3 | 16 | 15 | 0.062 | 68.0 |
| A4 | 478 | 462 | 0.066 | 69.2 |
| A5 | 11 | 11 | 0.097 | 70.2 |
| B1 | 0 | 0 | 0.070 | 86.2 |
| B2 | 15 | 15 | 0.078 | 102.3 |
| B3 | 0 | 0 | 0.079 | 105.6 |
| B4 | 0 | 0 | 0.071 | 86.3 |
| B5 | 975 | 982 | 0.078 | 102.3 |

Table 2 shows that, with regard to the batteries A1 to A5, the percentage increase in DCIR of the battery after the 2-month storage at 60° C. was low. In the battery A5, the initial DCIR was slightly high. This shows that the lithium ion concentration in the non-aqueous electrolyte is preferably set to 1 mol/liter or more.

Also, the battery B5 exhibited a high percentage increase in DCIR. This shows that the carbonic acid content in the non-aqueous electrolyte is preferably 900 ppm or less. In the case of not using the carboxylic acid and the lithium difluorophosphate in combination, the DCIR after storage showed a higher increase when using LFSI (B3) than when not using LFSI (B4). However, by using the carboxylic acid and the lithium difluorophosphate in combination, the DCIR after storage was suppressed low when using LFSI. The foregoing results show that the carboxylic acid, the lithium difluorophosphate, and the LFSI in combination can facilitate the formation of a surface film with better quality, thereby to suppress the inactivation of the positive electrode active material outer layer due to the side reaction of the electrolyte.

INDUSTRIAL APPLICABILITY

According to the non-aqueous electrolyte secondary battery of the present invention, a non-aqueous electrolyte secondary battery having excellent high-temperature storage characteristics can be provided. The non-aqueous electrolyte secondary battery according to the present invention is useful as a main power source for mobile communication devices, portable electronic devices, and other similar devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: electrode group, 2: positive electrode lead, 3: negative electrode lead, 4: battery case, 5: sealing plate, 6: negative electrode terminal, 7: gasket, 8: sealing stopper

The invention claimed is:

1. A non-aqueous electrolyte secondary battery, comprising:
a positive electrode; a negative electrode; a separator interposed between the positive electrode and the negative electrode; and a non-aqueous electrolyte, wherein
the non-aqueous electrolyte contains a lithium salt and a carboxylic acid,
the lithium salt includes lithium difluorophosphate, and
a content of the carboxylic acid in the non-aqueous electrolyte is 5 ppm or more and 900 ppm or less with respect to a mass of the non-aqueous electrolyte.

2. The non-aqueous electrolyte secondary battery according to claim 1, wherein the carboxylic acid includes at least one kind selected from the group consisting of monocarboxylic acids having two to four carbon atoms.

3. The non-aqueous electrolyte secondary battery according to claim 1, wherein the non-aqueous electrolyte further contains an alcohol.

4. The non-aqueous electrolyte secondary battery of claim 3, wherein a content of the alcohol in the non-aqueous electrolyte is 900 ppm or less with respect to the mass of the non-aqueous electrolyte.

5. The non-aqueous electrolyte secondary battery according to claim 3, wherein the alcohol includes methanol.

6. The non-aqueous electrolyte secondary battery according to claim 1, wherein a content of the lithium salt in the non-aqueous electrolyte is 1 mol/liter or more and 2 mol/liter or less.

7. The non-aqueous electrolyte secondary battery according to claim 1, wherein the lithium salt further includes lithium bis(fluorosulfonyl)imide.

8. A non-aqueous electrolyte, comprising:
a lithium salt; and a carboxylic acid, wherein
the lithium salt includes lithium difluorophosphate, and
a content of the carboxylic acid is 5 ppm or more and 900 ppm or less in terms of a mass ratio.

9. The non-aqueous electrolyte according to claim 8, wherein the carboxylic acid includes at least one kind selected from the group consisting of monocarboxylic acids having two to four carbon atoms.

10. The non-aqueous electrolyte according to claim 8, further comprising an alcohol.

11. The non-aqueous electrolyte according to claim 10, wherein a content of the alcohol is 900 ppm or less in terms of a mass ratio.

12. The non-aqueous electrolyte according to claim 10, wherein the alcohol includes methanol.

13. The non-aqueous electrolyte according to claim 8, wherein a content of the lithium salt is 1 mol/liter or more and 2 mol/liter or less.

14. The non-aqueous electrolyte according to claim 8, wherein the lithium salt further includes lithium bis(fluorosulfonyl)imide.

* * * * *